No. 700,432. Patented May 20, 1902.
J. LIZOTTE.
REVERSING MECHANISM.
(Application filed Feb. 13, 1902.)
(No Model.)
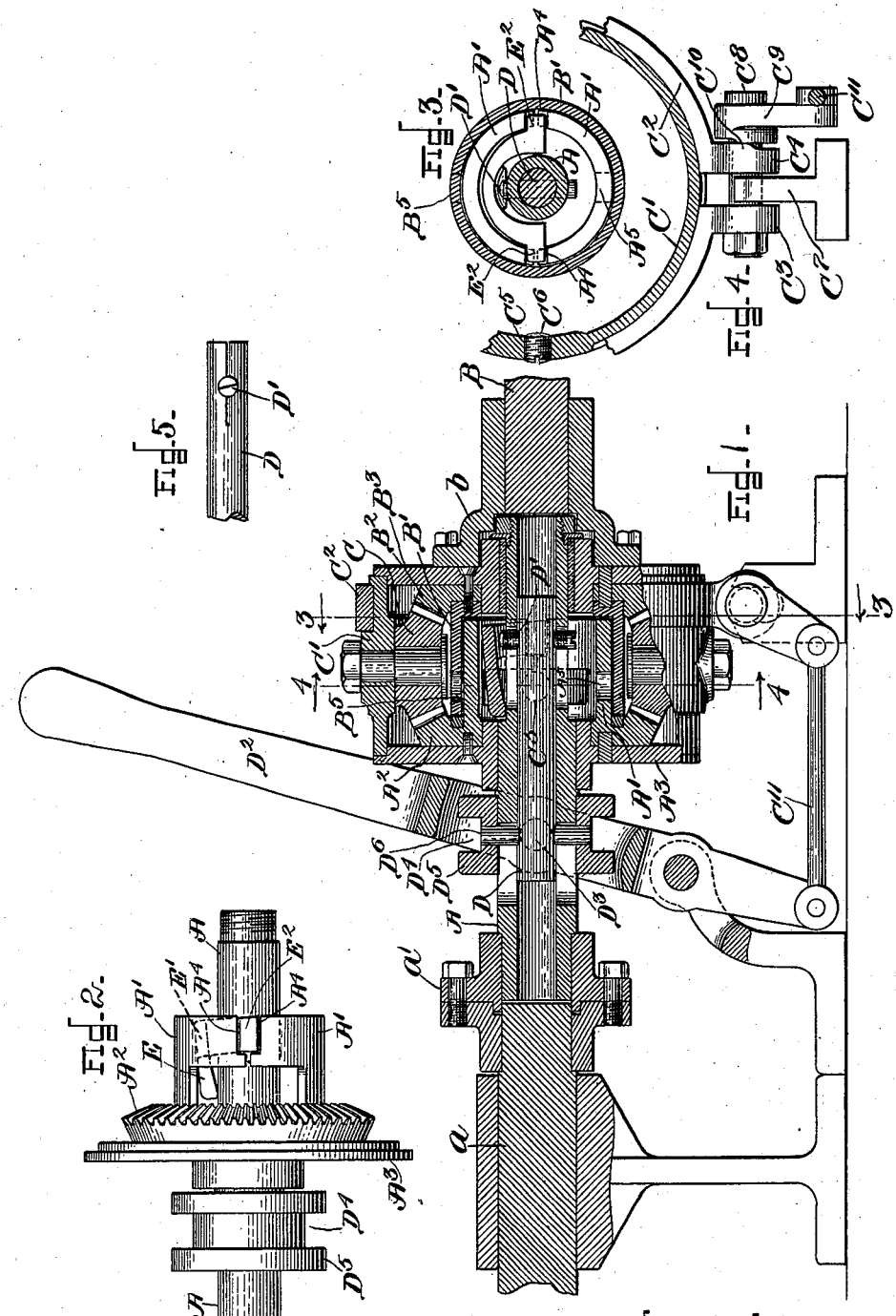
Witnesses
Katharine A. Dugan
Geo. N. Goddard
Inventor
Joseph Lizotte
by Ira L. Fish, Atty

UNITED STATES PATENT OFFICE.

JOSEPH LIZOTTE, OF QUINCY, MASSACHUSETTS, ASSIGNOR OF ONE-HALF TO MELLEN N. BRAY, OF BOSTON, MASSACHUSETTS.

REVERSING MECHANISM.

SPECIFICATION forming part of Letters Patent No. 700,432, dated May 20, 1902.

Application filed February 13, 1902. Serial No. 93,867. (No model.)

*To all whom it may concern:*

Be it known that I, JOSEPH LIZOTTE, of Quincy, in the county of Norfolk and State of Massachusetts, have invented certain new and useful Improvements in Reversing Mechanism, of which the following is a specification.

The invention relates to reversing mechanism for driving a shaft in either direction from a driving-shaft which is in axial alinement with the driven shaft and rotates in but one direction. This class of mechanism may be used in various relations and is especially useful in connection with small gas or other engines which are not conveniently reversed.

The object of the invention is to provide a simple and efficient reversing mechanism which is inexpensive and compact in construction and which may be conveniently operated and adjusted.

The mechanism comprises two bevel-gears secured to the driving and driven shafts, respectively, a support which carries one or more intermediate gears connecting these two gears and which may be held stationary or allowed to revolve, as the case may be, and a clutch for connecting the two gears together when the shafts are to rotate in the same direction. The clutch is arranged between the bevel-gears and is operated through a rod mounted in the hollow center of one of the shafts. This arrangement and manner of operating the clutch contribute to the simplicity and efficiency of the mechanism and are important features of the invention. The support for the intermediate gear or gears is in the form of a cylindrical drum which surrounds the gearing and clutch and in connection with the disks on which the drum is mounted forms a casing which incloses these parts and effectively protects them and enables the mechanism to be employed with advantage and to act efficiently under the unfavorable conditions, such as are met with where gas-engines are frequently employed.

A further feature of invention consists in an arrangement whereby the grip of the clutch may be readily adjusted without dismantling the mechanism, as will be more fully explained hereinafter.

These features as well as the other features will be made clear by a description of the mechanism in which I have embodied the various features of the invention, which mechanism is shown in the accompanying drawings.

In the drawings, Figure 1 is a longitudinal sectional view through the center of the mechanism. Fig. 2 is an elevation of the driving-shaft. Fig. 3 is a transverse sectional elevation on line 3 3, Fig. 1, looking toward the left. Fig. 4 is a partial sectional view through the cylindrical drum which supports the intermediate gears on line 4 4, Fig. 1, looking toward the right; and Fig. 5 is a detail of the end of the clutch-operating rod.

In the construction shown A is the driving-shaft, which may be connected with the crank-shaft $a$ of a gas-engine or to any other source of power by a coupling $a'$, and B is the driven shaft, which may be connected with the reversing mechanism through a coupling-flange $b$. When the shafts A and B are to revolve in the same direction, motion is transmitted from one to the other by a friction-clutch the engaging members of which consist of a cylindrical sleeve B', connected with the shaft B, and clutch-shoes A', connected with the shaft A and arranged to engage the inner surface of the sleeve B'. When the shafts are to revolve in opposite directions, the members of the clutch are disengaged and motion is transmitted from one shaft to the other through bevel-gears $A^2$ and $B^2$, secured, respectively, to the shafts A and B and connected by intermediate gears C, mounted upon a carrier C', which at this time is held stationary, but which is released and is free to revolve with the gears $A^2$ and $B^2$ when the clutch is engaged.

The gear $A^2$ is secured to the shaft A by being attached to a disk $A^3$, which is secured to the shaft A, and the gear $B^2$ is secured to the shaft B by being attached to a similar disk $B^3$, which is mounted on the end of the shaft A and is secured to shaft B through coupling $b$. These disks $A^3$ and $B^3$ are provided with annular grooves on the outer edges in which the ends of the supporting-drum C' fit, and these disks and the drum form a casing surrounding the gearing and clutch. The clutch-sleeve B' is secured to the inner face of the gear B², and the clutch-shoes A' are in the form of a split sleeve projecting from the inner face of the gear A², parts of the sleeve being cut away to enable the shoes A' to be more easily sprung outward against the inner surface of the sleeve B'.

The clutch members are engaged and disengaged through a sliding rod D, mounted in the shaft A, which is made hollow to receive it. At the inner end this rod carries a screw D', which projects radially outward through slots in the shaft A and is arranged to engage the arm E of a lever E', which operates the clutch-shoes A'. The lever E' is provided with a yoke at the forward end which embraces the shaft A, and the arms of this yoke are provided with lugs E², which lie in recesses A⁴ between the shoes A'. When the rod is advanced, as indicated in Figs. 1 and 2, the lugs rest freely in the recesses and the shoes A' spring in out of engagement with the sleeve B'. When the rod is moved toward the left, however, the end of the screw D' engages the arm E of the lever E' and acts as a cam for forcing said arm outward. This movement turns the lugs E² in the recesses A⁴, and thereby spreads the shoes A' outward into engagement with the sleeve B'. By adjusting the screw D' the grip of the clutch may be regulated to suit the requirements or to compensate for wear. To enable the adjustment of the screw D' without taking the mechanism apart, the sleeves A' and B' and the drums C' are provided with openings A⁵ B⁵ C⁵, which may be brought into alinement with each other and with the head of screw D'. The openings thus positioned allow access to the screw, so that it may be adjusted by inserting a screw-driver through the openings. A plug C⁶ is normally screwed into the opening C⁵ to close the same. The screw D' is held firmly in its adjusted position by the clamping action of the rod, which is split, as indicated in Fig. 5.

The rod D is moved to engage and disengage the clutch by a lever D², having pins D³, which ride in an annular groove D⁴, formed in a sleeve D⁵, which is mounted on the shaft A and is connected with the rod D by a pin D⁶.

When the clutch is engaged, the supporting-drum C' is free to revolve with the disks A³ B³ and gears A² B². When the shafts A and B are to revolve in opposite directions, however, the drum C' is held stationary by a clamping-strap C², which surrounds the drum. The ends of this strap are provided with ears C³ C⁴, which lie on opposite sides of a fixed arm C⁷. A bolt C⁸ passes through the ears C³ C⁴ and through a slot in the arm C⁷. An arm C⁹ is mounted between the head of this bolt and the ear C⁴, and is provided with a cam C¹⁰, arranged to coöperate with a similar cam on the ear C⁴ when the arm is turned. The arm is connected by a link C¹¹ with the lower end of lever D². When the lever is thrown into the position shown, the arm C⁹ is turned so that cams C¹⁰ act to draw the ends of the clamping-ring together, and thus hold the drum C' stationary. When the lever D² is moved toward the left, the arm C⁹ is moved so that the ends of the clamping-ring may spring apart, thus releasing the drum C'.

While I have referred to the shaft A as the "driving-shaft" and to the shaft B as the "driven shaft," it will be understood that either shaft may be the driver without affecting the mode of operation of the mechanism.

What I claim, and desire to secure by Letters Patent, is—

1. In a reversing mechanism the combination of two bevel-gears, a clutch arranged between said gears for directly connecting the same, a support, one or more intermediate gears engaging said bevel-gears carried by said support, means for engaging and disengaging said clutch, and means for holding and releasing said support, substantially as described.

2. In a reversing mechanism the combination of a hollow shaft, a bevel-gear secured thereto, a second bevel-gear, a clutch between said gears for directly connecting the same, a rod mounted in said shaft for operating the clutch, a support mounted to rotate with said gears, one or more intermediate gears engaging said bevel-gears carried by said support, and means for holding said support stationary, substantially as described.

3. In a reversing mechanism the combination of a hollow shaft, a second shaft, mechanism for driving one shaft from the other but in a reverse direction, clutch-shoes secured to the hollow shaft, a clutch-sleeve surrounding said shoes and connected to said second shaft, a lever for operating said shoes, a rod mounted in said hollow shaft, and a cam for operating said lever carried by said rod, substantially as described.

4. In a reversing mechanism the combination of two bevel-gears, a cylindrical clutch-sleeve secured to one gear, clutch-shoes secured to the other gear, a drum surrounding said gears, an intermediate gear engaging said gears carried by said drum, an adjustable cam within said clutch-shoes for operating the same, one of said shoes having an opening in line with said cam, and said sleeve and drum having openings arranged to be brought into alinement with said cam, substantially as described.

5. In a reversing mechanism the combination of gears A², B², a clutch-sleeve B' secured to gear B², a split sleeve A' secured to gear A², means for expanding the split sleeve A', a support C', intermediate gear C carried thereby, and means for holding said support stationary, substantially as described.

6. In a reversing mechanism the combination of disks A³, B³, gears A², B² secured thereto, clutch-sleeves A', B', means for expanding sleeve A', drum C', gears C, carried thereby, and means for holding drum C' stationary, substantially as described.

7. In a reversing mechanism, the combination of gears $A^2 B^2$, a support C', intermediate gears C carried thereby, clutch-sleeve B' and split sleeve A', a lever E' provided with lugs $E^2$, the parts of sleeve A' having recesses between them in which the lugs $E^2$ are located, a rod D, a cam D' on said rod for engaging the arm E of the lever E', substantially as described.

In testimony whereof I have affixed my signature in presence of two witnesses.

JOSEPH LIZOTTE.

Witnesses:
 IRA L. FISH,
 GEO. N. GODDARD.